United States Patent
Morris et al.

(10) Patent No.: US 7,640,244 B1
(45) Date of Patent: Dec. 29, 2009

(54) DYNAMIC PARTITION ENHANCED JOINING USING A VALUE-COUNT INDEX

(75) Inventors: J. Mark Morris, Poway, CA (US); Bhashyam Ramesh, San Diego, CA (US)

(73) Assignee: Teredata US, Inc., Miamisburg, OH (US)

( * ) Notice: Subject to any disclaimer, the term of this patent is extended or adjusted under 35 U.S.C. 154(b) by 759 days.

(21) Appl. No.: 10/862,689

(22) Filed: Jun. 7, 2004

(51) Int. Cl.
*G06F 17/30* (2006.01)

(52) U.S. Cl. .............................................. 707/9; 707/5
(58) Field of Classification Search ....................... 707/5
See application file for complete search history.

(56) References Cited

U.S. PATENT DOCUMENTS

| | | | |
|---|---|---|---|
| 4,956,774 A * | 9/1990 | Shibamiya et al. ............. | 707/2 |
| 5,241,648 A | 8/1993 | Cheng et al. | |
| 5,557,791 A * | 9/1996 | Cheng et al. ................... | 707/2 |
| 5,822,750 A | 10/1998 | Jou et al. | |
| 5,903,893 A | 5/1999 | Kleewein et al. | |
| 5,918,225 A * | 6/1999 | White et al. .................... | 707/3 |
| 5,930,785 A | 7/1999 | Lohman et al. | |
| 5,983,215 A | 11/1999 | Ross et al. | |
| 6,052,693 A | 4/2000 | Smith et al. | |
| 6,167,399 A | 12/2000 | Hoang | |
| 6,226,639 B1 | 5/2001 | Lindsay et al. | |
| 6,505,189 B1 * | 1/2003 | On Au et al. .................... | 707/2 |
| 6,944,633 B1 | 9/2005 | Higa et al. | |
| 2001/0014888 A1 | 8/2001 | Tsuchida et al. | |
| 2003/0074348 A1 | 4/2003 | Sinclair et al. | |
| 2003/0217033 A1 * | 11/2003 | Sandler et al. ................. | 707/1 |
| 2004/0172400 A1 | 9/2004 | Zarom et al. | |
| 2004/0249845 A1 * | 12/2004 | Das ............................. | 707/101 |
| 2004/0260684 A1 | 12/2004 | Agrawal et al. | |
| 2005/0149491 A1 | 7/2005 | Bakalash et al. | |
| 2005/0160102 A1 * | 7/2005 | Abdo et al. .................... | 707/100 |
| 2005/0240615 A1 | 10/2005 | Barsness et al. | |
| 2006/0047638 A1 | 3/2006 | Dettinger et al. | |

OTHER PUBLICATIONS http://www.novell.com/documentation/extendas37/docs/help/java/jdkee/cloudscape/doc/html/coredocs/sqlj18.htm Copyright © 1998 and 1999 Cloudscape, Inc. All rights reserved.*
http://www.cs.brown.edu/courses/cs227/Papers/Indexing/O'NeilGraefe.pdf SIGMOD Record, vol. 24, No. 3, Sep. 1995.*

(Continued)

*Primary Examiner*—Khanh B Pham
*Assistant Examiner*—Johnese Johnson
(74) *Attorney, Agent, or Firm*—Howard Speight

(57) ABSTRACT

Methods, computer programs, and database systems for performing a database query to join two or more tables on a condition are disclosed. Each table includes one or more join columns. Each of the join columns includes zero or more join-column values. The method includes excluding join-column values that do not satisfy the condition, using one or more value-count indexes and performing the database query on non-excluded join-column values.

22 Claims, 10 Drawing Sheets

OTHER PUBLICATIONS http://www.oreilly.com/catalog/transqlcook/errata/transqlcook.confirmed Jul. 15, 2002.* http://www.stanford.edu/dept/itss/docs/oracle/9i/server.920/a96533.pdf Oct. 2002.* http://www.databasejournal.com/features/mssql/article.php/1459141 Aug. 31, 2000.*

Eric Miner, Sybase, "Session No. DM131 New Optimizer and Query Execution Options in Adaptive Server Enterprise 12.0.", 1999, http://isug.com/ISUG3/docs/Techwave_Optimiser_notes.ppt.*

Plew, Ron et al., "Tables in SQL Queries", http://www.informit.com/articles/printerfriendly.asp?p=29842&rl=1 (*Sample chapter provided courtesy of Sams*), (Oct. 25, 2002),.

* cited by examiner

DYNAMIC PARTITION ENHANCED JOINING USING A VALUE-COUNT INDEX

CROSS REFERENCE TO RELATED APPLICATIONS

This application is related to the United States Patent Application entitled Dynamic Partition Enhanced Joining by Mark Morris and Bhashyam Ramesh, Ser. No. 10/862,686, filed on even date.

This application is related to the United States Patent Application entitled Dynamic Partition Enhanced Inequality Joining Using A Value-Count Index by Mark Morris and Bhashyam Ramesh, Ser. No. 10/862,649, filed on even date.

BACKGROUND

One important feature in relational database system (RDBMS) is the ability to perform queries that join columns from two or more tables. An example of a query including a join is:

SELECT T1.*, T2.*FROM T1, T2 WHERE T1.A condition T2.B;

where T1 and T2 are tables, T1.A is a column in T1, T2.B is a column in T2, and condition is a comparison between the operands to the condition. The example query above returns all of the columns in T1 horizontally concatenated with all of the columns in T2, for rows where T1.A and T2.B satisfy the equality condition. In mathematical terms, this query may be described as a Cartesian product with a condition or cross product with a condition.

SUMMARY

In general, in one aspect, the invention features a method of performing a database query to join two or more tables on a condition where each table includes one or more join columns. Each of the join columns include zero or more join-column values. The method includes excluding join-column values that do not satisfy the condition, using one or more value-count indexes and performing the database query on non-excluded join-column values.

Implementations of the invention may include one or more of the following. The database may include value-count indexes for each of the join columns. Excluding join-column values that do not satisfy the condition may include joining the value-count indexes for the join columns to produce a qualifying set. Performing the database query on non-excluded join-column values may include joining each of the tables with the qualifying set to produce a worktable and performing the database query on the worktables. Performing the database query on non-excluded join-column values may include creating an IN list populated with values from the qualifying set. Performing the database query on non-excluded join-column values may include scanning each of the tables. Performing the database query on non-excluded join-column values may include creating a worktable for each table. Performing the database query on non-excluded join-column values may include scanning each row in each table and if the one or more join columns have values in the IN list, adding the row to the worktable. Performing the database query on non-excluded join-column values may include performing the original query on the worktables.

A first join column may be in a first table and a second join column may be in a second table. The database may have a first-join-column-value-count index. Excluding values that do not satisfy the condition, using one or more value-count indexes may include joining the first-join-column-value-count index and the second table to produce a worktable. Performing the database query on non-excluded values may include performing the database query on the first table and the worktable. The join columns in the first set may not have value-count indexes and where join columns in the second set may have value-count indexes.

In general, in another aspect the invention features a method of performing a database query to join two or more tables on an inequality condition. Each table includes one or more join columns. The database includes a value-count index for each join column. Each value-count index includes one or more indexed values and one or more counts. The method includes defining two or more partitions for each table, using the one or more value-count indexes and performing the database query on one partition from each table.

Implementations of the invention may include one or more of the following. Defining two or more partitions may include joining the value-count indexes for the join columns to create a qualifying set. Defining two or more partitions may include joining each table with the qualifying set to create two or more work tables. One or more of the work tables may include values that do not satisfy the inequality condition. One of the work tables may include values that satisfy the inequality condition. Performing the database query on one partition from each table may include performing the database query on the worktables that include values that do not satisfy the inequality condition and may also include storing the query result. The method may also include generating one or more Cartesian products for one or more pairs of work tables, where one or more of the work tables in the pair satisfy the inequality condition. The method may also include storing the Cartesian products. The method may also include merging the query result and Cartesian products.

In general, in another aspect, the invention features a computer program, stored on a tangible storage medium, for performing a database query to join two or more tables on a condition. Each table includes one or more join columns. Each of the join columns includes zero or more join-column values. The computer program including executable instructions that cause a computer to exclude join-column values that do not satisfy the condition, using one or more value-count indexes and cause the computer to perform the database query on non-excluded join-column values.

In general, in another aspect, the invention features a computer program, stored on a tangible storage medium, for performing a database query to join two or more tables on an inequality condition. Each of the tables includes one or more join columns. The database includes a value-count index for each join column. Each value-count index includes one or more indexed values and one or more counts. The computer program includes executable instructions that cause a computer to define two or more partitions for each table using the one or more value-count indexes. The computer program includes executable instructions that cause a computer to perform the database query on one partition from each table.

In general, in another aspect, the invention features a database system including a massively parallel processing system. The massively parallel processing system includes one or more nodes, a plurality of CPUs, a plurality of data storage facilities, and a process for execution on the massively parallel processing system for performing a database query to join two or more tables on an inequality condition. Each of the nodes provides access to one or more CPUs. Each of the one or more CPUs provides access to one or more data storage facilities. Each table includes one or more columns. The database includes a value-count index for each join column. Each value-count index includes one or more indexed values and one or more counts. The process includes defining two or more partitions for each table with a join column using the one or more value-count indexes. The process includes performing the database query on one partition from each table.

In general, in another aspect, the invention features a database system including a massively parallel processing system. The massively parallel processing system includes one or more nodes, a plurality of CPUs, a plurality of data storage facilities, and a process for execution on the massively parallel processing system for performing a database query to join two or more tables on an inequality condition. Each of the nodes provides access to one or more CPUs. Each of the one or more CPUs provides access to one or more data storage facilities. Each table includes one or more columns. The database includes a value-count index for each join column. Each value-count index includes one or more indexed values and one or more counts. The process includes defining two or more partitions for each table with a join column using the one or more value-count indexes. The process includes performing the database query on one partition from each table.

DETAILED DESCRIPTION

Figure 1:
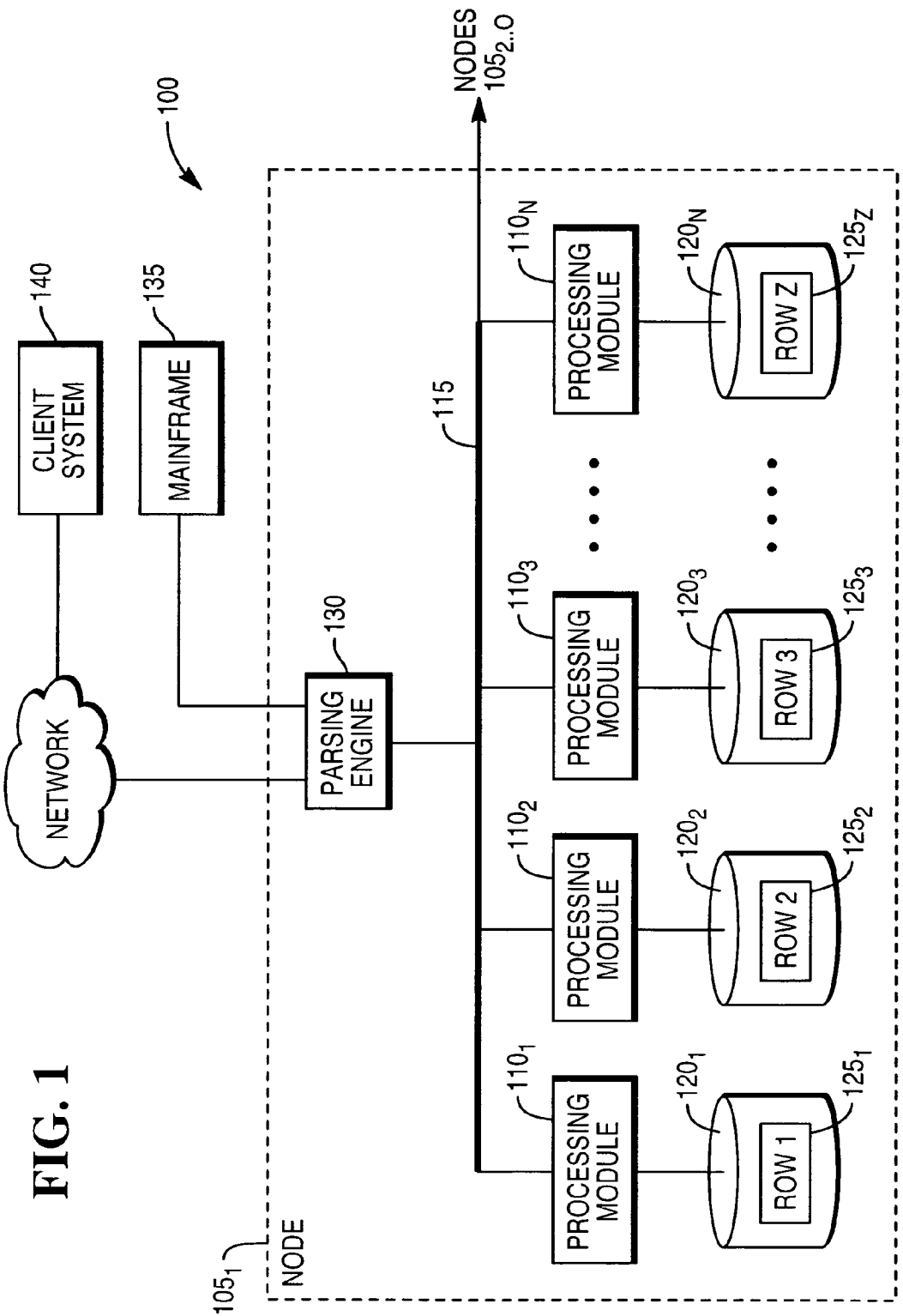
FIG. 1 is a block diagram of a node of a database system.

The techniques for performing joins disclosed herein have particular application, but are not limited, to large databases that might contain many millions or billions of records managed by a database system ("DBS") 100, such as a Teradata Active Data Warehousing System available from NCR Corporation. FIG. 1 shows a sample architecture for one node $105_1$ of the DBS 100. The DBS node $105_1$ includes one or more processing modules $110_{1 \ldots N}$, connected by a network 115, that manage the storage and retrieval of data in data-storage facilities $120_{1 \ldots N}$. Each of the processing modules $110_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1 \ldots N}$ manages a portion of a database that is stored in a corresponding one of the data-storage facilities $120_{1 \ldots N}$. Each of the data-storage facilities $120_{1 \ldots N}$ includes one or more disk drives. The DBS may include multiple nodes $105_{2 \ldots O}$ in addition to the illustrated node $105_1$, connected by extending the network 115.

The system stores data in one or more tables in the data-storage facilities $120_{1 \ldots N}$. The rows $125_{1 \ldots Z}$ of the tables are stored across multiple data-storage facilities $120_{1 \ldots N}$ to ensure that the system workload is distributed evenly across the processing modules $110_{1 \ldots N}$. A parsing engine 130 organizes the storage of data and the distribution of table rows $125_{1 \ldots Z}$ among the processing modules $110_{1 \ldots N}$. The parsing engine 130 also coordinates the retrieval of data from the data-storage facilities $120_{1 \ldots N}$ in response to queries received from a user at a mainframe 135 or a client computer 140. The DBS 100 usually receives queries and commands to build tables in a standard format, such as SQL.

In one implementation, the rows $125_{1 \ldots Z}$ are distributed across the data-storage facilities $120_{1 \ldots N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket." The hash buckets are assigned to data-storage facilities $120_{1 \ldots N}$ and associated processing modules $110_{1 \ldots N}$ by a hash bucket map. The characteristics of the columns chosen for the primary index determine how evenly the rows are distributed.

Figure 2:
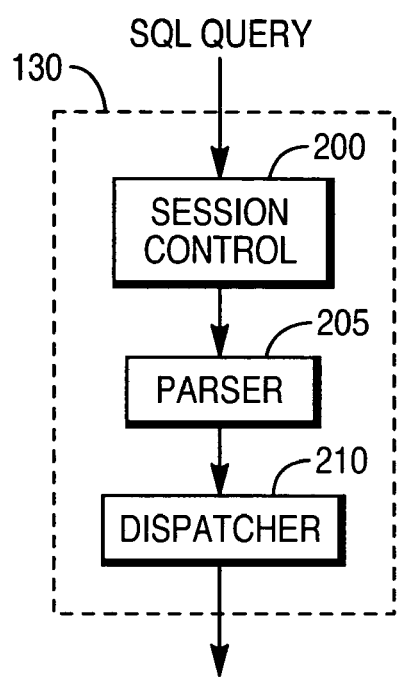
FIG. 2 is a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
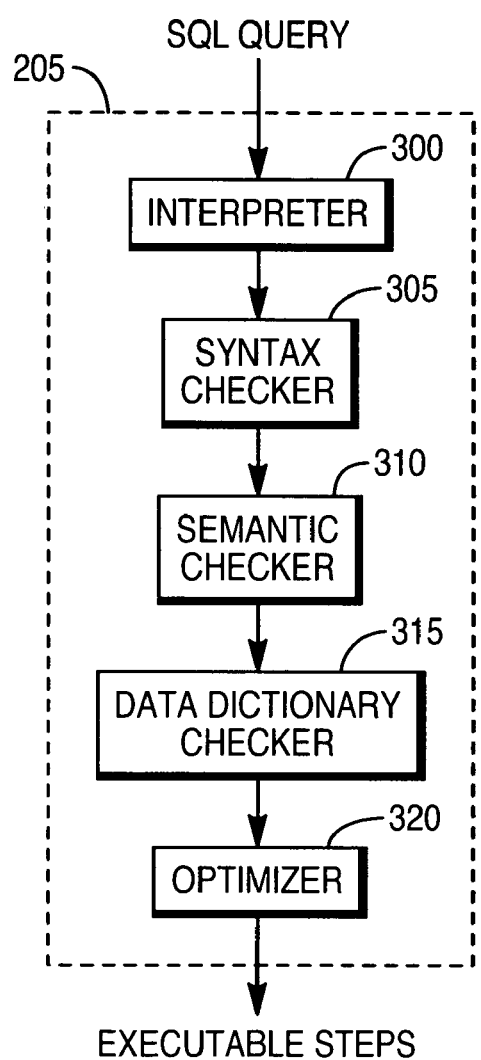
FIG. 3 is a flow chart a flow chart of a parser.

Once the session control 200 allows a session to begin, a user may submit a SQL query, which is routed to the parser 205. As illustrated in FIG. 3, the parser 205 interprets the SQL query (block 300), checks it for proper SQL syntax (block 305), evaluates it semantically (block 310), and consults a data dictionary to ensure that all of the objects specified in the SQL query actually exist and that the user has the authority to perform the request (block 315). Finally, the parser 205 runs an optimizer (block 320), which develops the least expensive plan to perform the request.

Figure 4:
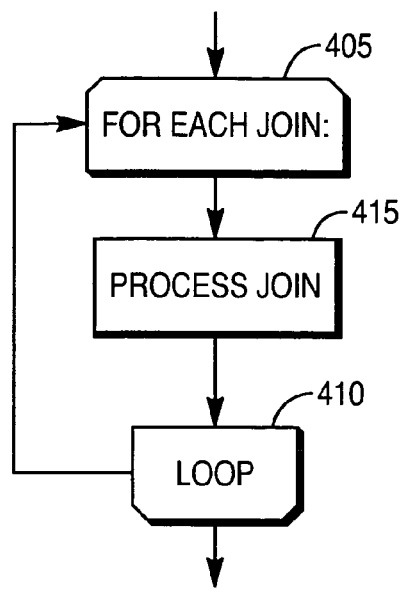
FIG. 4 is a flow chart of a system for performing joins.

An example system for processing a SQL query including one or more joins is shown in FIG. 4. Assume that the system receives the following SQL query:

SELECT T1.*, T2.*, T3.* FROM T1, T2, T3 WHERE T1.A condition T2.B AND T1.A condition T3.C;

where T1, T2, and T3 are tables, T1.A is a column in T1, T2.B is a column in T2, and T3.C is a column in T3, and "condition" is a comparison between two operators. In one example implementation, the system joins T1 and T2 on the condition "T1.A condition T2.B". The system also joins T1 and T3 on the condition "T1.A condition T3.C". Finally, the system joins the two previous results. In this example implementation, the query is decomposed into three join operations and the system loops (blocks 405 and 410) three times.

Another example system for performing a SQL query including one or more joins performs the example SQL query above using two joins. The system performs a join between T1 and T2 on the condition "T1.A condition T2.B" and stores the result. In one example implementation, the result is stored in a work table or a spool table S1. The system then performs a join between T3 and S1 on the condition "S1.A condition T3.C".

Figure 5:
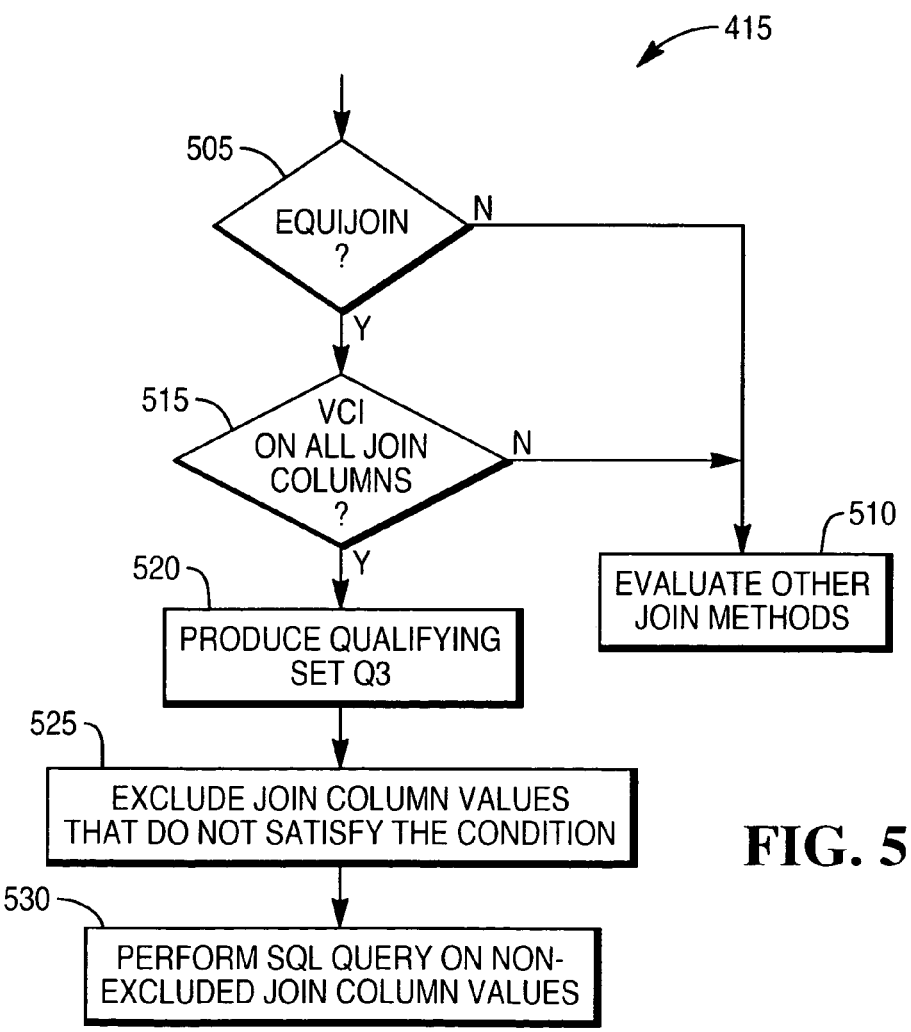
FIG. 5 is a flow chat of a system for processing a join.

Within the loop defined by blocks 405 and 410 the system processes the join (block 415). One example system for processing the join is shown in FIG. 5. The system starts and determines if the join is an equijoin (i.e., if the join condition is equality between one or more columns). For example, the following SQL query is an equijoin:

SELECT T1.*, T2.* FROM T1, T2 WHERE T1.A equality_condition T2.B;

where equality_condition is "=" or any other equality condition. If the join is not an equijoin, the system evaluates other methods to process the join (block 510). Otherwise, the system determines if the DBS 100 includes a Value Count Index (VCI) for each of the join columns (e.g., T1.A and T2.B). A VCI is a mechanism or data structure for tracking which values appear in a column and how many times the values appear in the column. One example VCI is an aggregate join index that is automatically updated each time a value the in indexed column is added, deleted, or altered. The VCI typically contains two columns: a value column and a count column. The value column represents the value in the indexed column and the count column represents the number of occurrences of the value in the column.

Returning to FIG. 5, if the DBS 100 does not include VCIs for each of the join columns (block 515), the system evaluates other join methods (block 510), otherwise the system produces a qualifying set Q3 (block 520).

Figure 6:
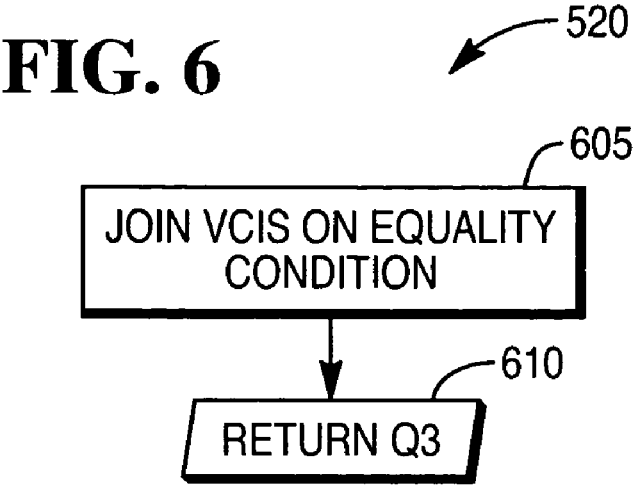
FIG. 6 is a flow chart of a system for creating a qualifying set.

An example system for producing a qualifying set Q3 (block 520) is shown in FIG. 6. The system joins the VCIs for the join columns on an equality condition (block 605). For example, assuming the system is processing the SQL query given above, the system may perform the following query to determine the qualifying set Q3:

SELECT VCI1a.Value FROM VCI1a, VCI2b WHERE VCI1a.Value equality_condition VCI2b.Value;

where VCI1a is the VCI for column T1.A, VCI2b is the VCI for column T2.B, and where each VCI includes a Value column representing the value of the indexed column and a Count column representing the count of the indexed value in the column. The selected value, VCI1a.Value is placed in Q3 to produce the qualifying set. After joining the VCIs for the join columns on an equality condition, the system returns Q3 (block 610).

Figure 7:
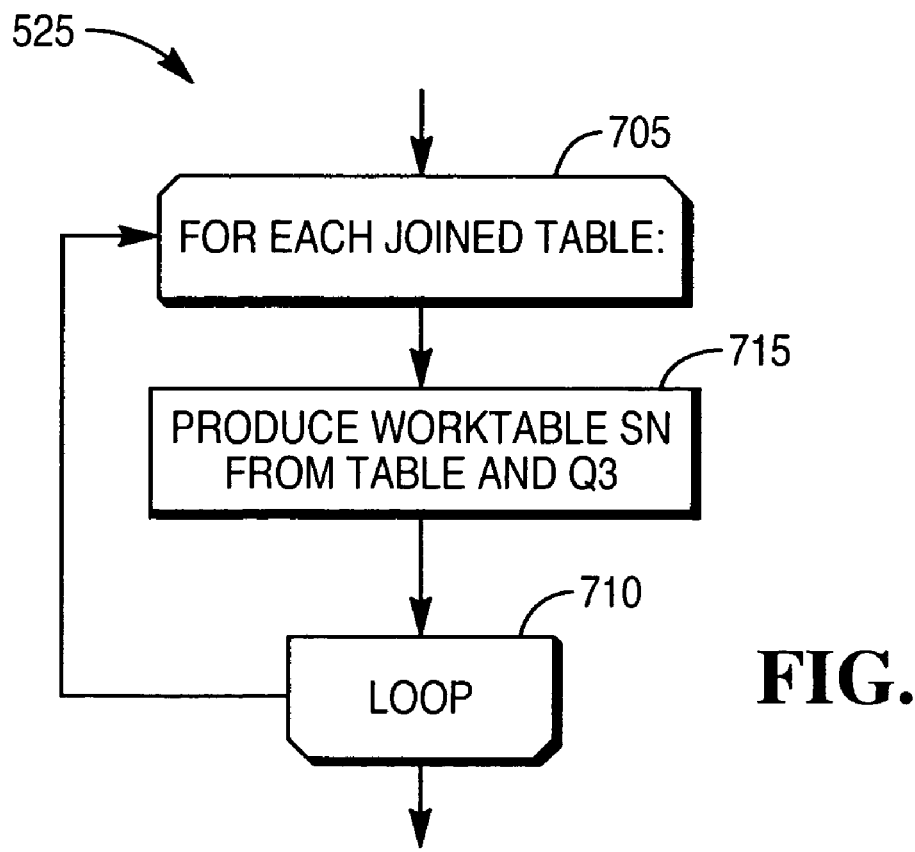
FIG. 7 is a flow chart of a system for excluding values.

Returning to FIG. 5, the system excludes join column values that do not satisfy the join condition (block 525). An example system for performing this exclusion is shown in FIG. 7. The system enters a loop defined by block 705 and 710, and loops once for each joined table (block 705). Within the loop, the system produces one or more worktables SL, where L is an integer, from the table and Q3 (block 715).

Figure 8:
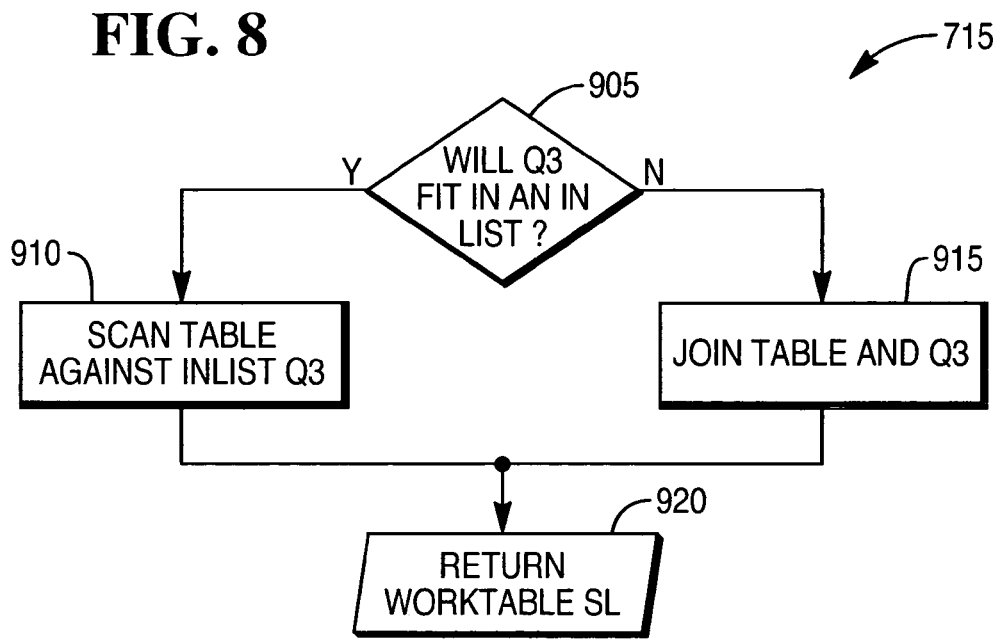
FIG. 8 is a flow chart of a system for generating a worktable.

An example system for producing the worktable SL (block 715) is shown in FIG. 8. The example system determines if the elements of Q3 will fit in an IN list (block 805). In certain implementations of the DBS 100, the maximum number of terms in an IN list is fixed and the cardinality of Q3 may be too large to fit in an IN list. If Q3 will fit in an IN list, the system scans the table against the IN list (block 810). If the value in the join column of the table is equal to a value in the IN list, the row of the table containing the join column value is added to the worktable SL. If Q3 will not fit in an IN list, the system performs a join of the join column of the table and Q3 to produce the worktable SL that contains rows from the table where the value of the join column is in equal to a value in Q3 (block 815). In certain example systems where only some of the columns of the table are needed to complete the query, only the necessary columns are added to the worktable SL. After producing the worktable SL by scanning (block 810), or by using a join (block 815), the system returns the worktable SN (block 820).

Figure 9:
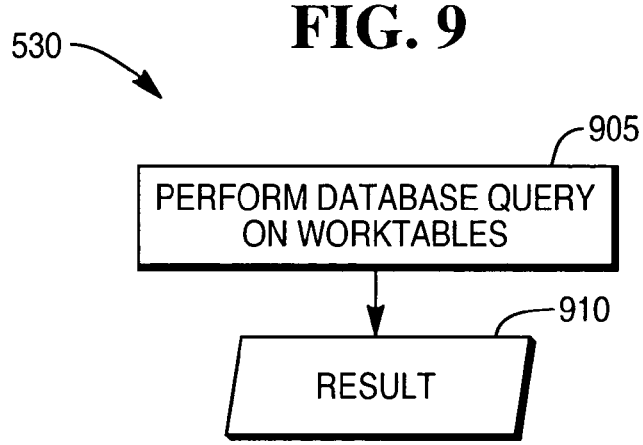
FIG. 9 is a flow chart of a system for performing a join.

Returning to FIG. 5, the system performs the database query on the non-excluded join column values (block 530). An example system performing the database query on non-excluded join column values is shown in FIG. 9. The system performs the SQL query on the worktables SL (block 905) and returns a result (block 910). For example, if the system produced worktables S4 and S5 for the SQL query described above, an example system performs the SQL query on the worktables S4 and S5 using the following query:

SELECT S4.*, S5.* from S4, S5 WHERE S4.A equality_condition S5.B;

where S4 is the table T1 qualified by Q3, S5 is the table T2 qualified by Q3, and S4.A and S5.B are columns in S4 and S5, respectively.

Figure 10:
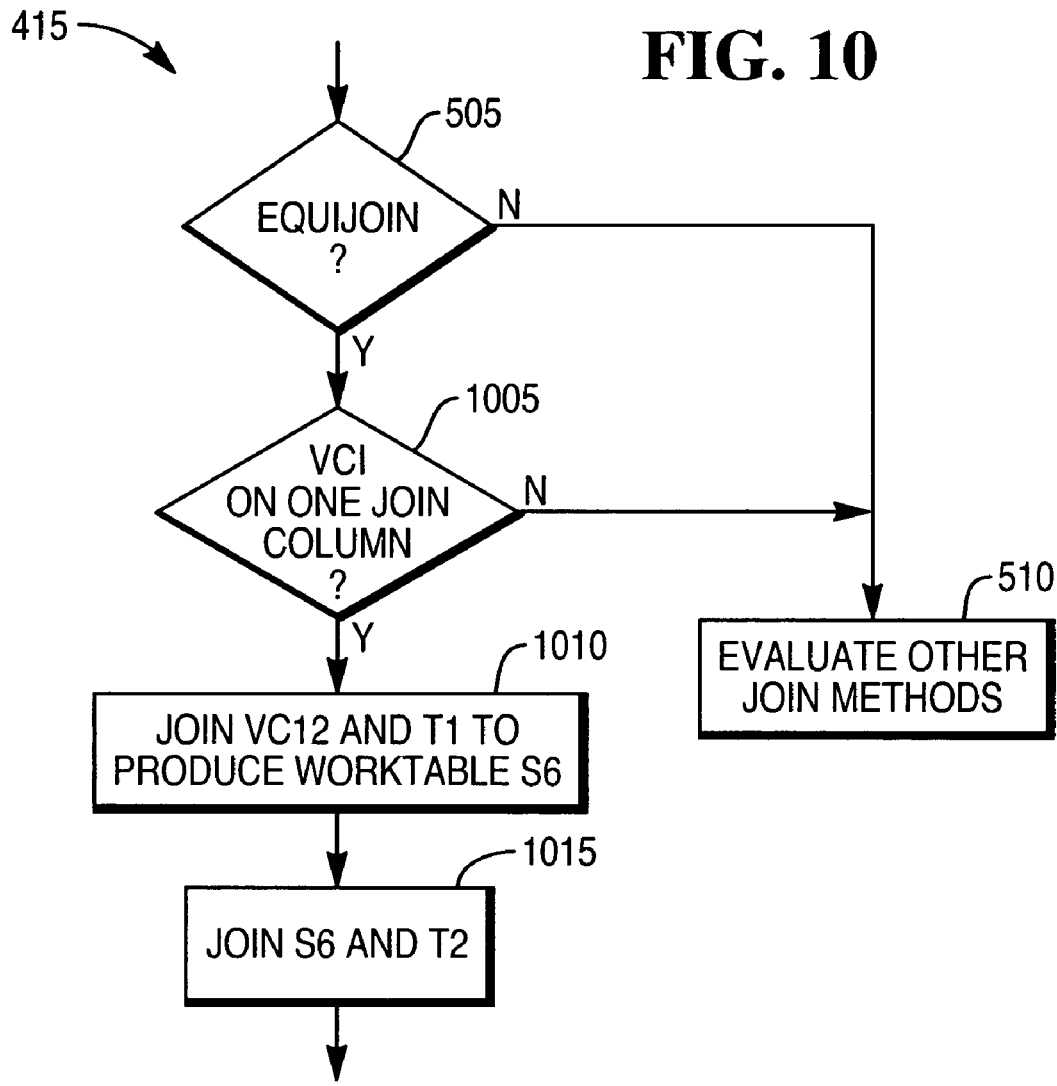
FIG. 10 is a flow chart of a system for performing a join.

Another example system for processing the join (block 415, FIG. 4) is shown in FIG. 10. The system determines if the join is an equijoin (block 505, as described with respect to FIG. 5). If the join is not an equijoin, the system evaluates other join methods (block 510), otherwise the system determines if the DBS 100 includes at least one VCI for a join column (block 1005). If the DBS 100 does not include a VCI for any of the join columns, the system evaluates other join methods (block 510). If the DBS 100 includes at least one VCI for a join column, the system joins the VCI for a table in the query (e.g., T2, where the VCI for T2 is VCI2) and a table in the query (e.g., T1) to produce a worktable S6 (block 1010). The resulting worktable S6 contains rows from T1 where the join column value equals a value indexed by VCI2. In certain example systems, the join may be replaced with a scan of T1, such as the scan described with respect to block 810 in FIG. 8. After producing worktable S6, the system joins S6 and T2 (block 1015). One example system performs the join between S6 and T2 using the following SQL query:

SELECT S6.*, T2.* from S6, T2 WHERE S6.A equality_condition T2.B;

In certain implementations of system, the join performed in block 1015 may be omitted if the result of the query only needs to contain the column in T2 that is indexed by VCI2. In such a situation, the Count values of VCI2 may be used to satisfy the SQL query.

Figure 11:
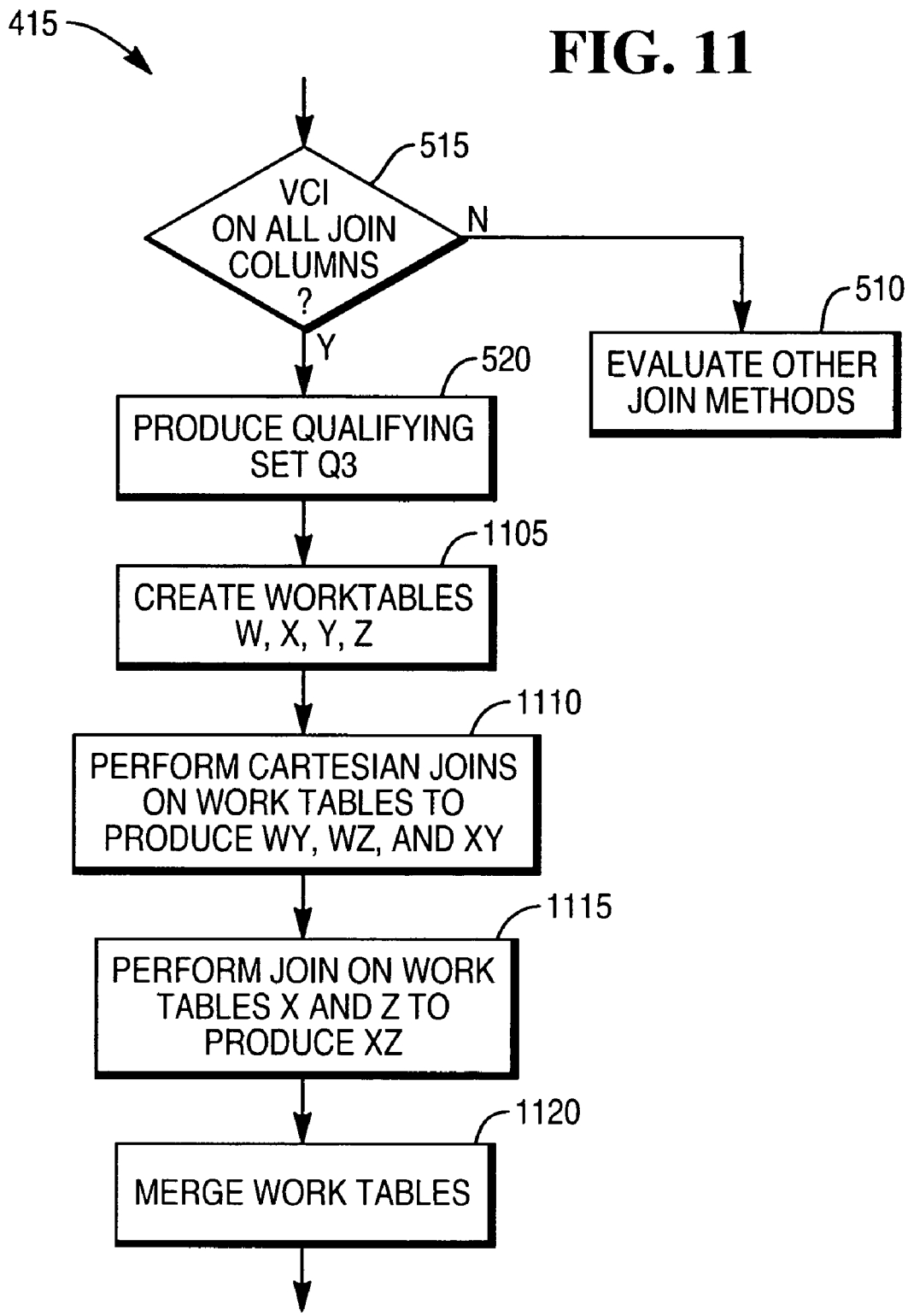
FIG. 11 is a flow chart of a system for performing a join.

FIG. 11 shows another example system for processing the join (block 415, FIG. 4). For purposes of explanation, the system will be described with respect to the following join query which may be part of a larger SQL query:

SELECT T1.*, T2.* FROM T1, T2 WHERE T1.A inequality_condition T2.B;

where inequality_condition is a comparison that evaluates if the operands to the condition are unequal. An example inequality_condition is "< >."

The system determines if there is a VCI on all join columns (block 515, as described with respect to FIG. 5) and, if not, the system evaluates other join methods (block 510). If there is a VCI on all the join columns (block 515), the system produces a qualifying set Q3 (block 520, as described with respect to FIG. 5). The system creates worktables W, X, Y, and Z (block 1105).

Figure 12:
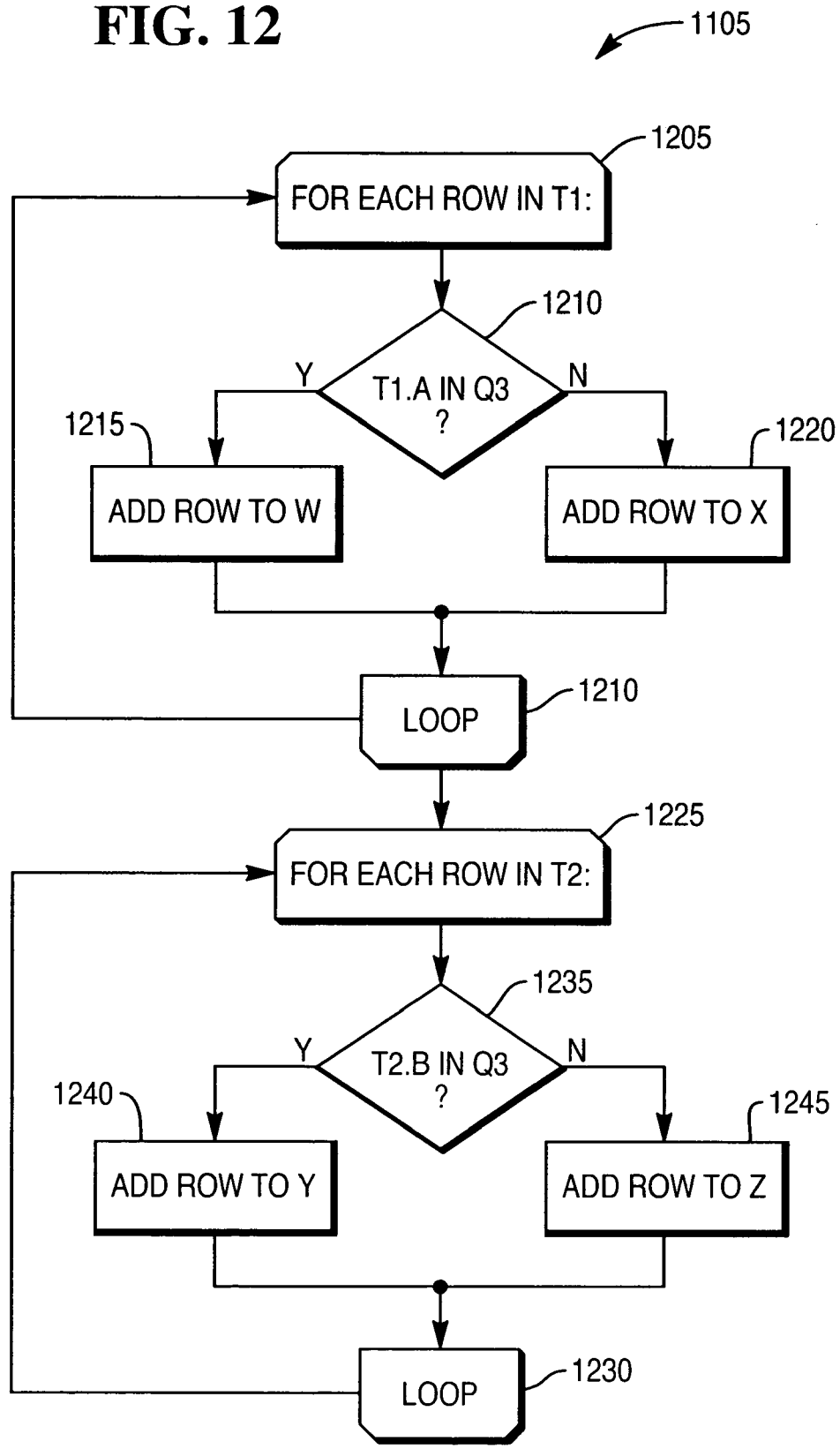
FIG. 12 is a flow chart of a system for creating worktables.

An example system for producing the worktables W, X, Y, and Z (block 1105) is shown in FIG. 12. The system enters a loop defined by block 1205 and 1210 and loops once for each row in T1 (block 1205). Within the loop, the system determines if T1.A is in Q3 (block 1210) and, if so, it adds the row to worktable W (block 1215) otherwise it adds the row to worktable X (block 1220). After completing the loop defined by block 1205 and 1210, the system enters a loop defined by blocks 1225 and 1230 and loops once for each row in T2 (block 1125). Within the loop, if T2.B is in Q3 (block 1235) the system adds the row to worktable Y (block 1240), otherwise the system adds the row to worktable Z (block 1245).

Figure 13:
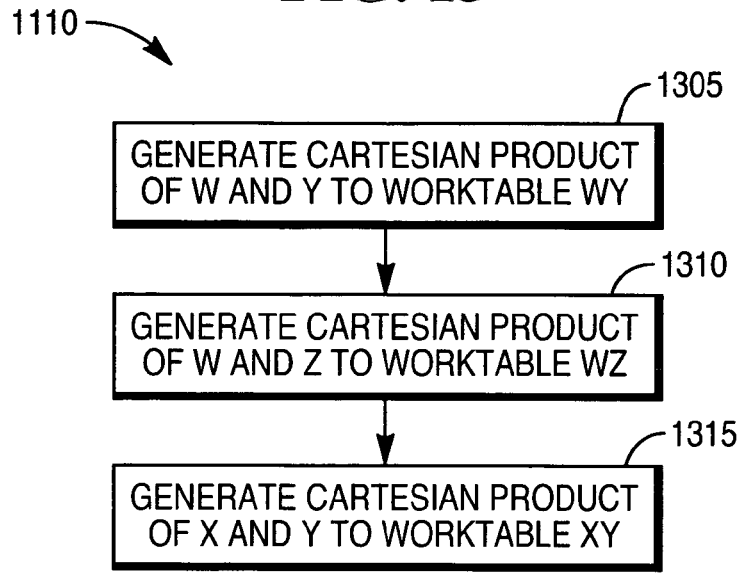
FIG. 13 is a flow chart of a system for creating worktables.

Returning to FIG. 11, the system performs Cartesian joins on the work tables to produce worktables WY, WZ, and XY (block 1110). An example system for performing the Cartesian joins is shown in FIG. 13. The system generates a Cartesian product of worktables W and Y and places the result in worktable WY (block 1305). An example Cartesian product is a join of a first table with a second table where each row in the first table is horizontally concatenated to each row in the second table. The system generates the Cartesian product of worktables W and Z and places the result in worktable WZ (block 1310). The system generates the Cartesian product of worktables X and Y and places the result in the worktable XY (block 1315).

Figure 14:
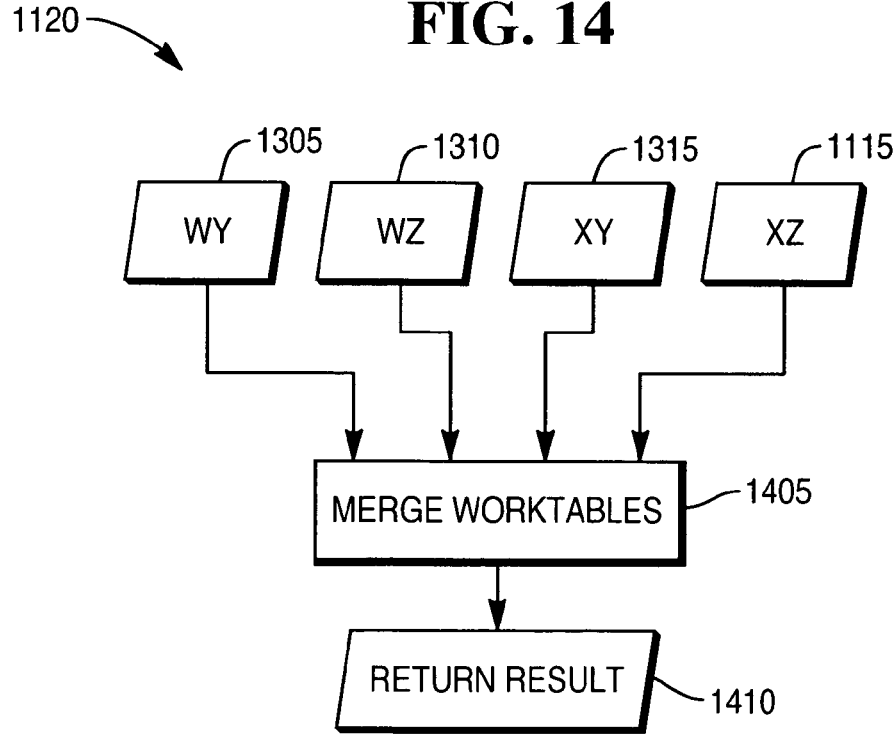
FIG. 14 is a flow chart of a system for merging worktables.

Returning to FIG. 11, the system performs the join on worktables X and Z to produce XZ (block 1115). An example query for performing the join on worktables X and Z is:

SELECT X.*, Z.* FROM X, Z WHERE X.A inequality_condition Z.B;

where inequality_condition is the join condition, X and Z are worktables, and X.A and Z.B are columns in the worktables. The system merges the worktables to produce the result (block 1120). An example system of merging the worktables is shown in FIG. 14. The system receives worktables WY (discussed with respect to block 1305 in FIG. 13), WZ (discussed with respect to block 1310 in FIG. 13), XY (discussed with respect to block 1315 in FIG. 13), and XZ (discussed with respect to block 1115 in FIG. 11). The system merges the worktables (block 1405). In certain example systems, the worktables are vertically concatenated to create the resulting table. The system returns the resulting table (block 1410).

Figure 15:
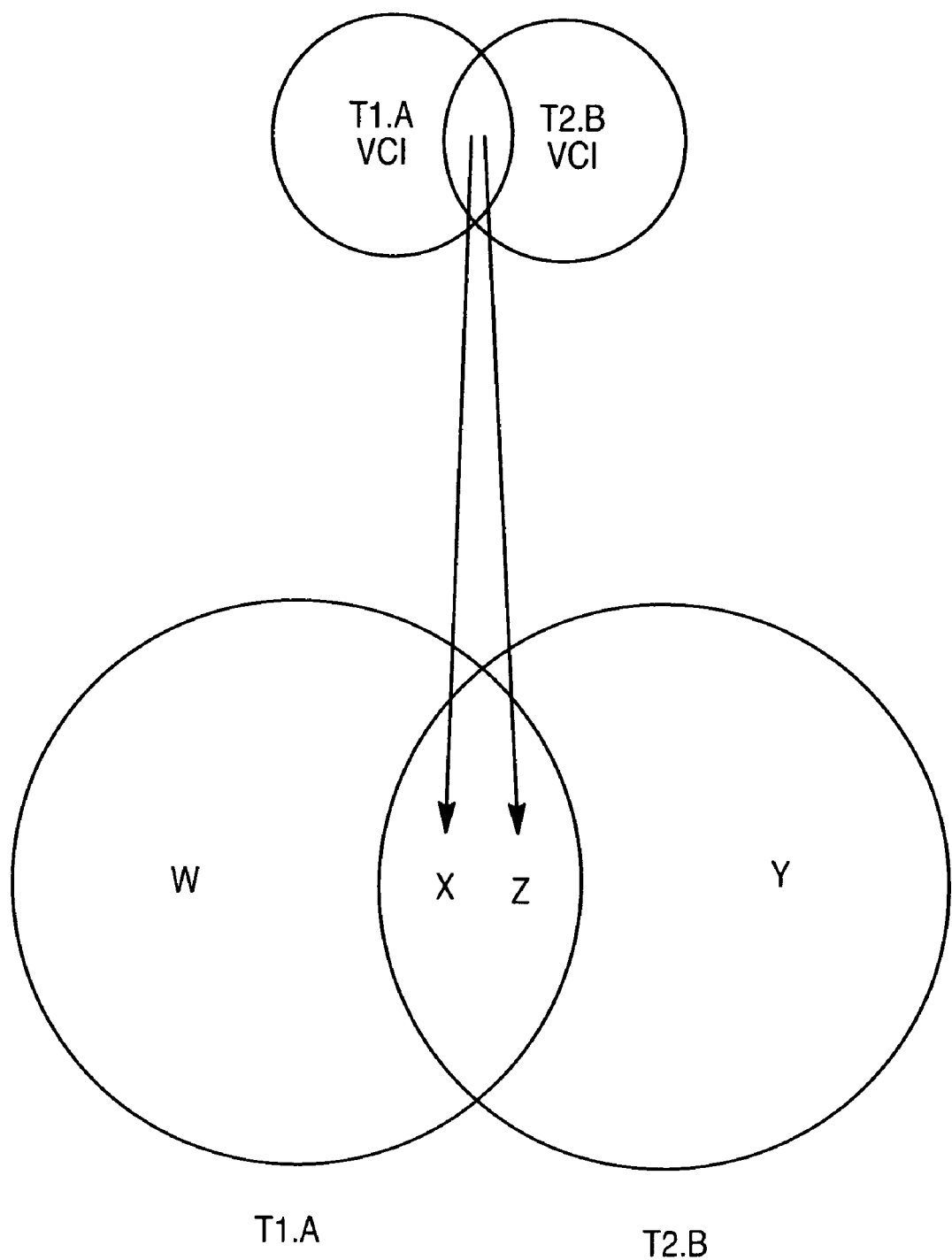
FIG. 15 is a illustration of a system for performing a join.

FIG. 15 is a diagram representation of the join process 415, as performed by the system shown in FIG. 11.

Although the system for processing joins has been described with respect to certain example SQL queries, the system may be used with many other SQL queries. For example, the system may be used with SQL queries including OUTER JOIN or DISTINCT terms.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of performing a database query to join two or more tables on a condition, each table including one or more join columns, each of the join columns including zero or more join-column values, and the method including:

excluding join-column values that do not satisfy the condition, by joining value-count indexes for each of the join columns to produce a qualifying set, where each value-count index includes one or more values that appear in an indexed column and a count of the number of times the one or more values appear in the indexed column; and joining each of the tables with the qualifying set to produce a worktable;

performing the database query on the worktables.

2. The method of claim 1, where a first join column is in a first table, and a second join column is in a second table, the database has a first-join-column-value-count index, and where joining each of the tables with the qualifying set to produce a worktable includes:

joining the first-join-column-value-count index and the second table to produce a worktable.

3. The method of claim 1, where performing the database query on the worktables includes:

performing the database query on the first table and the worktable.

4. A method of performing a database query to join two or more tables on a condition, each table including one or more join columns, each of the join columns including zero or more join-column values, where the join columns in a first set do not have value-count indexes and where join columns in a second set have value-count indexes, where a first join column is in a first table, and a second join column is in a second table, the database has a first-join-column-value-count index, and where excluding values that do not satisfy the condition, and the method including:

excluding join-column values that do not satisfy the condition, by joining the first-join-column-value-count index and the second table to produce a worktable, where each value-count index includes one or more values that appear in an indexed column and a count of the number of times the one or more values appear in the indexed column; and performing the database query on the first table and the worktable.

5. A method of performing a database query to join two or more tables on an inequality condition, each table including one or more join columns, the database including a value-count index for each join column, where each value-count index includes one or more values that appear in an indexed column and a count of the number of times the one or more values appear in the indexed column, the method including:

joining the value-count indexes for the join columns to create a qualifying set;

for each table:

joining the table with the qualifying set to create two or more work tables, where one of the work tables includes values that do not satisfy the inequality condition, and where at least one of the work tables includes values that satisfy the inequality condition; and performing the database query on one partition from each table.

6. The method of claim 5, where performing the database query on one partition from each table includes:

performing the database query on worktables that include values that do not satisfy the condition; and storing the query result.

7. The method of claim 6, including:

generating one or more Cartesian products for one or more pairs of worktables, where one or more of the worktables in the pair satisfy the inequality condition; and storing the Cartesian products.

8. The method of claim 7, including:
merging the query result and Cartesian products.

9. A computer program, stored on a tangible storage medium, for performing a database query to join two or more tables on a condition, each table including one or more join columns, each of the join columns including zero or more join-column values, where a first join column is in a first table, and a second join column is in a second table, the database has a first-join-column-value-count index, the computer program including executable instructions that cause a computer to:
exclude join-column values that do not satisfy the condition, by joining the first-join-column-value-count index and the second table to produce a worktable, where each value-count index includes one or more values that appear in an indexed column and a count of the number of times the one or more values appear in the indexed column; and
perform the database query on non-excluded join-column values.

10. The computer program of claim 9, where the database includes value-count indexes for each of the join columns, and where the executable instructions that cause the computer to exclude join-column values that do not satisfy the condition further cause the computer to:
join the value-count indexes for the join columns to produce a qualifying set.

11. The computer program of claim 10, where the executable instructions that cause the computer to perform the database query on non-excluded join-column values further cause the computer to:
join each of the tables with the qualifying set to produce a worktable; and
perform the database query on the worktables.

12. The computer program of claim 10, where the executable instructions that cause the computer to perform the database query on non-excluded join-column values further cause the computer to:
create an IN list populated with values from the qualifying set;
scan each of the tables;
for each table:
create a worktable;
scan each row in the table; and
for each row in the table:
if the one or more join columns have values in the IN list, add the row to the worktable; and
perform the database query on the worktables.

13. The computer program of claim 9, where the executable instructions that cause the computer to perform the database query on non-excluded values further cause the computer to:
performing the database query on the first table and the worktable.

14. The computer program of claim 13, where the join columns in the first set do not have value-count indexes and where join columns in the second set have value-count indexes.

15. A computer program, stored on a tangible storage medium, for performing a database query to join two or more tables on an inequality condition, each of the tables including one or more join columns, the database including a value-count index for each join column, each value-count index including one or more indexed values and one or more counts, the computer program including executable instructions that cause a computer to:
join the value-count indexes for the join columns to create a qualifying set;
for each table:
define two or more partitions, using the one or more value-count indexes, where each value-count index includes one or more values that appear in an indexed column and a count of the number of times the one or more values appear in the indexed column by joining the table with the qualifying set to create two or more work tables, where one of the work tables includes values that do not satisfy the inequality condition, and where at least one of the work tables includes values that satisfy the inequality condition; and
perform the database query on one partition from each table.

16. The computer program of claim 15, where the executable instructions that cause the computer to perform the database query on one partition from each table further cause the computer to:
perform the database query on the worktables that include values that do not satisfy the inequality condition; and
store the query result.

17. The computer program of claim 16, where the executable instructions further cause the computer to:
generate one or more Cartesian products for one or more pairs of worktables, where one or more of the worktables in the pair satisfy the inequality condition; and
store the Cartesian products.

18. The computer program of claim 17, where the executable instructions further cause the computer to:
merge the query result and Cartesian products.

19. A database system including:
a massively parallel processing system including:
one or more nodes;
a plurality of CPUs, each of the one or more nodes providing access to one or more CPUs;
a plurality of data storage facilities each of the one or more CPUs providing access to one or more data storage facilities;
a process for execution on the massively parallel processing system for performing a database query to join two or more tables on an inequality condition, each table including one or more columns, the database including a value-count index for each join column, where each value-count index includes one or more values that appear in an indexed column and a count of the number of times the one or more values appear in the indexed column, the process including:
joining the value-count indexes for the join columns to create a qualifying set;
for each table with a join column:
defining two or more partitions, using the one or more value-count indexes, by joining the table with the qualifying set to create two or more work tables, where one of the work tables includes values that do not satisfy the inequality condition, and where at least one of the work tables includes values that satisfy the inequality condition; and
performing the database query on one partition from each table.

20. The database system of claim 19, where performing the database query on one partition from each table includes:
performing the database query on the worktables that include values that do not satisfy the inequality condition; and
storing the query result.

21. The database system of claim 20, where the process includes:

generating one or more Cartesian products for one or more pairs of worktables, where one or more of the worktables in the pair satisfy the inequality condition; and storing the Cartesian products.

22. The database system of claim 21, where the process including:

merging the query result and Cartesian products.

* * * * *

UNITED STATES PATENT AND TRADEMARK OFFICE
CERTIFICATE OF CORRECTION

PATENT NO. : 7,640,244 B1  Page 1 of 1
APPLICATION NO. : 10/862689
DATED : December 29, 2009
INVENTOR(S) : John Mark Morris et al.

It is certified that error appears in the above-identified patent and that said Letters Patent is hereby corrected as shown below:

Title page item 73
Assignee: should read Teradata US, Inc., Miamisburg, OH (US)

Signed and Sealed this

Sixteenth Day of November, 2010

David J. Kappos
*Director of the United States Patent and Trademark Office*